(12) United States Patent
Masutani et al.

(10) Patent No.: US 10,040,701 B2
(45) Date of Patent: Aug. 7, 2018

(54) MEMBRANE SEPARATION DEVICE

(71) Applicant: KUBOTA CORPORATION, Osaka-shi, Osaka (JP)

(72) Inventors: Hidetoshi Masutani, Amagasaki-Shi (JP); Yasunobu Okajima, Amagasaki-Shi (JP)

(73) Assignee: Kubota Corporation, Osaka (JP)

( * ) Notice: Subject to any disclaimer, the term of this patent is extended or adjusted under 35 U.S.C. 154(b) by 435 days.

(21) Appl. No.: 13/944,534

(22) Filed: Jul. 17, 2013

(65) Prior Publication Data

US 2013/0299412 A1    Nov. 14, 2013

Related U.S. Application Data

(63) Continuation of application No. PCT/JP2012/050904, filed on Jan. 18, 2012.

(30) Foreign Application Priority Data

Jan. 18, 2011 (JP) ................... 2011-008132

(51) Int. Cl.
*C02F 1/44* (2006.01)
*B01D 63/08* (2006.01)
(Continued)

(52) U.S. Cl.
CPC .............. *C02F 1/44* (2013.01); *B01D 63/082* (2013.01); *B01D 65/00* (2013.01); *B01D 65/08* (2013.01);
(Continued)

(58) Field of Classification Search
CPC ............ B01D 2313/02; B01D 2313/04; B01D 2313/06; B01D 2313/12; B01D 2313/20;
(Continued)

(56) References Cited

U.S. PATENT DOCUMENTS 2,124,861 A * 7/1938 Saddington ............ B01D 61/28
127/10
4,749,482 A * 6/1988 Bonn ................... B01D 25/215
100/115
(Continued)

FOREIGN PATENT DOCUMENTS

EP    2 260 929     12/2010
JP    10-066843    3/1998
(Continued)

OTHER PUBLICATIONS

International Search Report in PCT/JP2012/050904 dated Apr. 24, 2012.
(Continued)

*Primary Examiner* — Dirk R Bass
(74) *Attorney, Agent, or Firm* — Beyer Law Group LLP

(57) ABSTRACT

A membrane separation device includes a plurality of membrane elements each having a separation membrane arranged on front and back sides of a flat filter plate, wherein the membrane elements are oriented vertically and arranged in an array separated by a fixed distance such that the separation membranes are facing one another. A narrowing member is provided outside of the membrane element arranged at the outermost position along the arrangement direction, the narrowing member being disposed at least in a vicinity of a bonding portion of the filter plate and the separation membrane along the vertical direction thereof so as to be separated from the outermost membrane element by a predetermined distance smaller than the fixed distance T, thereby avoiding rupture of the separation membrane provided on outer side of the outermost membrane element even if aeration is continued in a state in which the filtering operation is stopped.

13 Claims, 9 Drawing Sheets

(51) Int. Cl.
  *B01D 65/00* (2006.01)
  *B01D 65/08* (2006.01)
  *C02F 3/12* (2006.01)

(52) U.S. Cl.
  CPC ...... *B01D 2313/20* (2013.01); *B01D 2313/23* (2013.01); *B01D 2315/06* (2013.01); *B01D 2321/185* (2013.01); *C02F 3/1273* (2013.01); *C02F 2303/16* (2013.01); *Y02W 10/15* (2015.05)

(58) Field of Classification Search
  CPC ............ B01D 2313/23; B01D 2313/26; B01D 2315/06; B01D 2321/185; B01D 63/081; B01D 63/082; B01D 65/00; B01D 65/003; B01D 65/08; B01D 2317/022; B01D 61/18; B01D 69/06; C02F 1/44; C02F 2303/16; C02F 2303/20; C02F 2303/22; C02F 3/1273
  USPC .................................... 210/321.84, 483, 486
  See application file for complete search history.

(56) References Cited

U.S. PATENT DOCUMENTS

| | | | | |
|---|---|---|---|---|
| 5,482,625 | A * | 1/1996 | Shimizu | B01D 61/18 210/231 |
| 6,641,726 | B1 * | 11/2003 | Sebastian | B01D 25/164 210/231 |
| 7,279,215 | B2 * | 10/2007 | Hester et al. | 428/178 |
| 2005/0123727 | A1 | 6/2005 | Hester et al. | |

FOREIGN PATENT DOCUMENTS

| | | |
|---|---|---|
| JP | 2008-199994 | 9/2008 |
| JP | 2009-154101 | 7/2009 |
| JP | 2010-247086 | 11/2010 |
| WO | WO 2008/117783 | 10/2008 |
| WO | WO 2009/122460 | 10/2009 |

OTHER PUBLICATIONS

Supplementary Search Report dated Mar. 2, 2016 from EP Application No. 12736511.2.

* cited by examiner

MEMBRANE SEPARATION DEVICE

CLAIM OF PRIORITY

The present application is a Continuation of International Application No. PCT/JP2012/050904 filed on Jan. 18, 2012, which claims benefit of Japanese Patent Application No. 2011-008132 filed Jan. 18, 2011. The entire contents of each application noted above are hereby incorporated by reference.

BACKGROUND OF INVENTION

1. Field of Invention

The present invention relates to a membrane separation device suitable for water treatment, such as sewage treatment and wastewater treatment, which employs an activated sludge process.

2. Description of the Related Art

Conventionally, sewage treatment and wastewater treatment employing the activated sludge process use a submerged membrane separation device for a liquid-solid separation which is necessary in the treatment process.

For example, Japanese Laid-Open Patent No. JP H07-256282A discloses a membrane separation type small-sized wastewater treatment tank provided with a built-in membrane separation device having a plurality of membrane elements. Each of the membrane elements includes a membrane support body having a plate or sheet-like shape and a separation membrane for filtration disposed on each of the front and rear surfaces of the membrane support body. The plurality of membrane elements are arranged in a longitudinal position with a fixed interval such that the separation membranes of the membrane elements are facing one another and each of the membrane elements is supported with a side portion thereof in a transverse direction.

Each of the membrane elements has a suction nozzle connected to a collection pipe, where each suction nozzle leads out treated water which has been filtered through the separation membrane. Filtration operation is performed by operating a suction unit such as a pump such that the treated water is sucked via the collection pipe.

Such a membrane separation device is provided with a diffuser at a lower part thereof. An air-lift action of air bubbles supplied from the diffuser causes an upward flow in a distance between the membrane elements in which the water to be treated goes up together with the activated sludge, and the upward flow of this gas-liquid mixed phase provides aeration cleaning of the membrane surface of the separation membrane.

Such aeration cleaning prevents deterioration of the membrane-separation function caused by fouling. Also, it is known that the cleaning effect of the separation membrane is enhanced by carrying out aeration from the diffuser in a state where the filtration operation by the separation membrane is stopped.

However, as shown in FIG. 10A, a bonding portion 83 in which the membrane support body 81 and the separation membrane 82 are joined each other along the longitudinal direction is formed on both sides of the membrane element 80 in the transverse direction.

As shown in FIG. 10B, if the aeration by the diffuser is continued when the filtration operation is stopped, the treated water collected between the membrane support body 81 and the separation membrane 82 and a gas component which has been dissolved into the treated water and then evaporated when filtered through the separation membrane 82 are pushed upward by the upward flow caused by the air-lift action, so as to form a big bulging portion 84 in an upper part of the membrane element 80. As a result, the bulging portion 84 acts as resistance against the upward flow so as to cause vibrations in the separation membrane 82.

An amount of the bulge of the separation membranes 82 bulging into a space between the adjacent membrane elements 80 which are arranged to have the fixed distance therebetween is restricted when the bulging portions 84 touch each other. However, since there is no separation membrane to restrict the bulge of the separation membrane 82 between the membrane element 80 which is disposed at the outermost end along the arrangement direction and a cover member 85 which is arranged outside of the outermost membrane element 80 with the same interval, the amount of the bulge of the separation membrane 82 of the outermost membrane element 80 becomes large.

As a result, an angle between the membrane support body 81 and the separation membrane 82 in the vicinity of the bonding portion 83 on the outer side of the outermost membrane element 80 becomes larger than an angle between the membrane support body 81 and the separation membrane 82 in the vicinity of the bonding portion 83 on the inner side of the outermost membrane element. Consequently, a large force is applied to the separation membrane 82 in the bonding portion 83, causing a problem that there is a risk that the separation membrane 82 may rupture.

SUMMARY OF THE INVENTION

Thus, in view of the problem mentioned above, the objective of the present invention is to provide a membrane separation device in which the separation membrane arranged on the outer side of the outermost membrane element can be prevented from rupturing even if the aeration is continued when the filtering operation has been stopped.

In order to achieve the above-mentioned objective, the first characteristic structure of the membrane separation device in accordance with one embodiment of the present invention is that in a membrane separation device comprising a plurality of membrane elements, each of the membrane elements includes a membrane support body in a form of a flat panel or sheet and a separation membrane provided on each of a front surface and a rear surface of the support body, wherein the plurality of membrane elements are arranged in a longitudinal position such that the separation membranes are facing one another with a fixed distance provided therebetween, and a narrowing member is provided outside of an outermost membrane element which is disposed outermost along an arrangement direction, wherein the narrowing member is provided at least in a vicinity of a bonding portion of the membrane support body and the separation membrane of the outermost membrane element such that the narrowing member is separated from the outermost membrane element by a predetermined distance smaller than the fixed distance.

When the aeration by a diffuser is continued and the filtration operation is stopped, the treated water and gas which are collected between the membrane support body and the separation membrane are pushed upwards by an upward flow, whereby a bulging portion is formed in an upper portion of the membrane element. In such a situation, however, in accordance with the above-described structure, since the narrowing member is provided outside of the outermost membrane element along the arrangement direction such that the narrowing member is separated from the outermost membrane element by a predetermined distance smaller than the interval of the membrane elements, the degree of the bulge of the separation membrane in the vicinity of the bonding portion of the outermost membrane element is restricted by abutting the narrowing member.

As a result, an angle between the membrane support body and the separation membrane at the bonding portion is restricted to be smaller than that without the narrowing member, and the force repeatedly applied to the separation membrane of the bonding portion is suppressed, whereby the risk that the separation membrane may rupture can be reduced.

The second characteristic structure in accordance with one embodiment of the present invention is that the narrowing member is provided at least near an upper portion of the bonding portion, in addition to the first characteristic structure as described above.

Although the bulging portion of the separation membrane may become larger in the upper portion of the membrane element, if the narrowing member is provided at least near the upper portion of the bonding portion, the degree of the bulge of the separation membrane is effectively restricted, thereby realizing an inexpensive and compact narrowing member.

The third characteristic structure in accordance with one embodiment of the present invention is that the narrowing member is formed as a part of a cover member which is provided to maintain the fixed distance from the outermost membrane element in the arrangement direction, in addition to the above-mentioned first or second characteristic structures.

Since a part of the cover member which maintains the fixed distance from the outermost membrane element disposed outermost along the arrangement direction serves as the narrowing member, and the cover member and the narrowing member can be integrally formed, an inexpensive membrane separation device can be realized without causing an increase in the number of parts.

The fourth characteristic structure in accordance with one embodiment of the present invention is that the separation membrane is turned over at least at an upper side edge of the membrane support member so as to be disposed on both of front and rear sides of the membrane support member, in addition to any one of the above-mentioned first to third characteristic structures.

Since the separation membrane is turned over at least at the upper side edge of the membrane support member so as to be disposed on both of the front and rear sides of the membrane support member, the bulging portion is formed in the upper portion of the front and rear sides of the membrane element and in the upper side edge portion of the membrane support body. As a result, the degree of the bulge formed on the side surface of the membrane support body can become small, and thus the resistance to the upward flow of air bubbles or water to be treated can be reduced.

The fifth characteristic structure in accordance with one embodiment of the present invention is that the predetermined distance is set equal to or smaller than a half of the fixed distance, in addition to any one of the above-mentioned first to fourth characteristic structures.

For the bulging portion of the separation membrane which is formed on each of the opposing surfaces of the membrane elements arranged to have the fixed distance therebetween, the degree of the bulge is suppressed to about a half of the fixed distance between the membrane elements by abutting another bulging portion opposing thereto. In addition, since the narrowing member is provided for the separation membrane of the outermost membrane element disposed at the outermost position along the arrangement direction with the predetermined distance which is equal to or smaller than the fixed distance, the degree of the bulge is suppressed to equal to or smaller than that of the bulging portion of the separation membrane formed in each of the opposing surfaces of the membrane elements. As a result, the risk of the rupture of the separation membrane of the outermost membrane element arranged in the outermost position can be inhibited very effectively.

As described above, in accordance with the present invention, it has become possible to provide a membrane separation device which is able to extremely effectively suppress the rupture of the separation membrane disposed on the outer side of the outermost membrane element even if the aeration is continued when the filtering operation has been stopped.

BRIEF DESCRIPTION OF THE DRAWINGS

FIG. 2 is a diagram explaining the membrane module.

DESCRIPTION OF EMBODIMENTS OF THE PRESENT INVENTION

Figure 1:
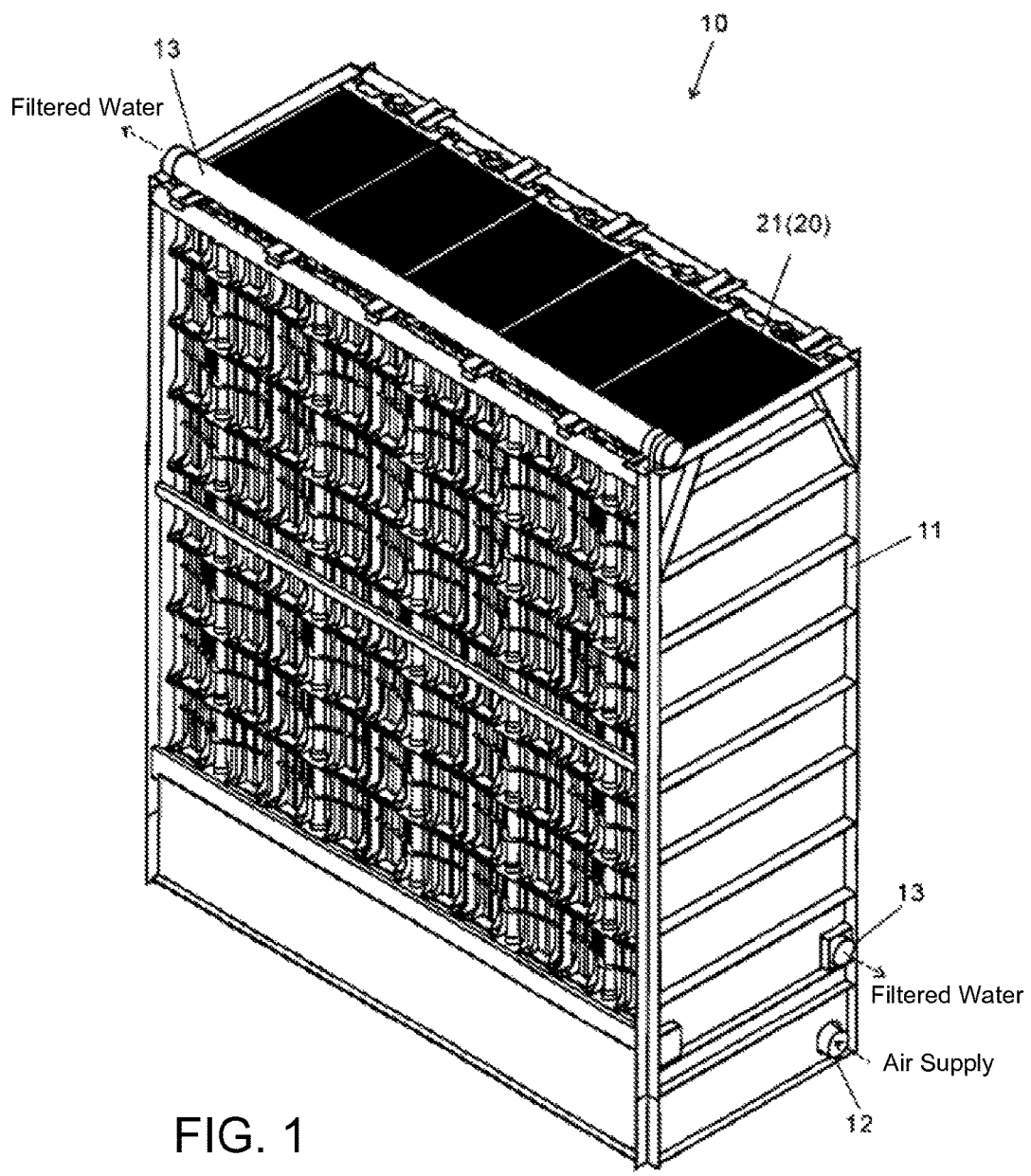
FIG. 1 is a diagram explaining a membrane separation device.
Figure 2:
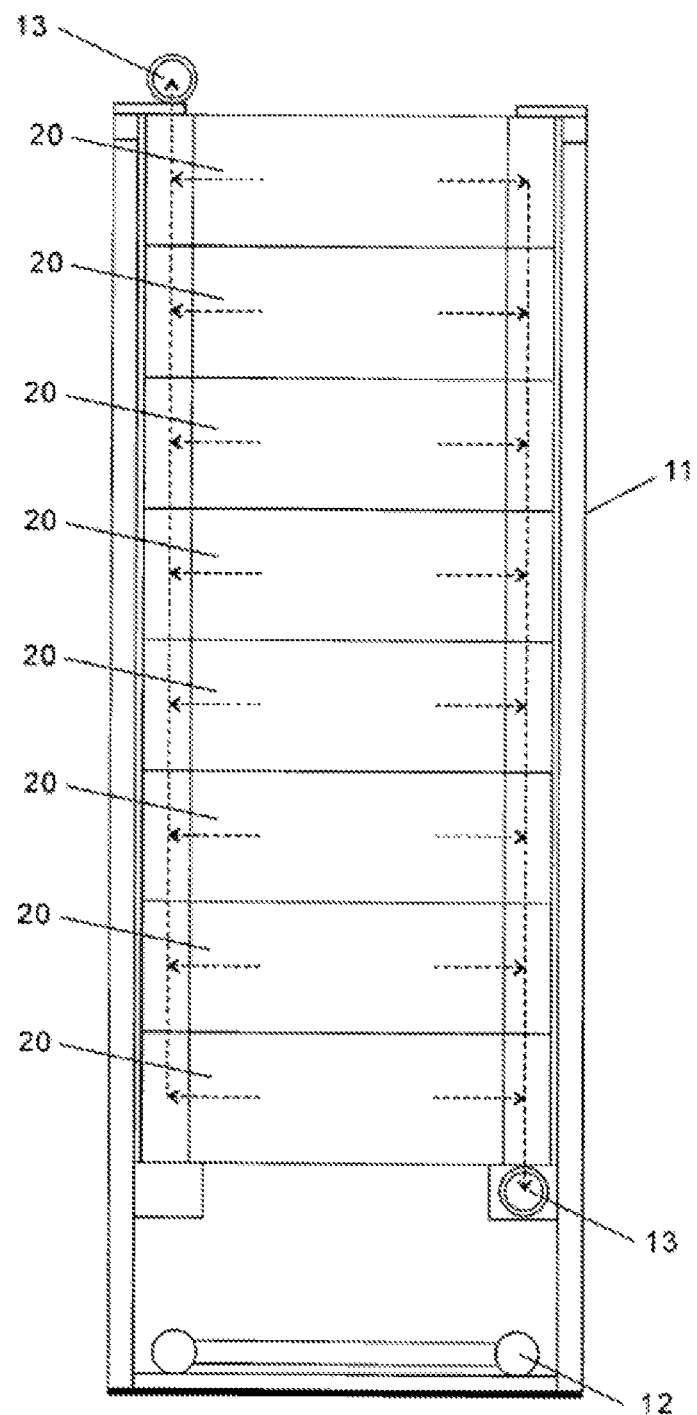
FIG. 2 is a diagram explaining the separation device and a membrane module.

Hereafter, the membrane separation device in accordance with the present invention is described. As shown in FIG. 1 and FIG. 2, a membrane separation device 10 includes five rows of membrane module groups which are laterally arranged in a main body frame 11 and submerged into water to be treated in a membrane separation tank. In each membrane module group, membrane modules 20 are longitudinally arranged to form an eight-layered stack.

A diffuser air supply pipe 12 is provided under the membrane module 20 at the bottom of the stack, and the diffusion air supplied by the diffuser air supply pipe 12 causes an upward flow of the water to be treated between a plurality of membrane elements 21 which are in a longitudinal position and laterally arranged in a horizontal direction in each of the membrane module 20. The treated water which has been filtered through the membrane surface of each membrane element 21 is led to the outside of the tank via a collection pipe 13.

The collection pipe 13 is in communication with a treated water delivery pipe (not shown) which leads to a treated water tank installed in the outside of the membrane separation tank, and a pumping apparatus is installed in a middle of the pipeline. The diffuser air supply pipe 12 is in communication with an air supply source such as a blower or a compressor.

Figure 3:
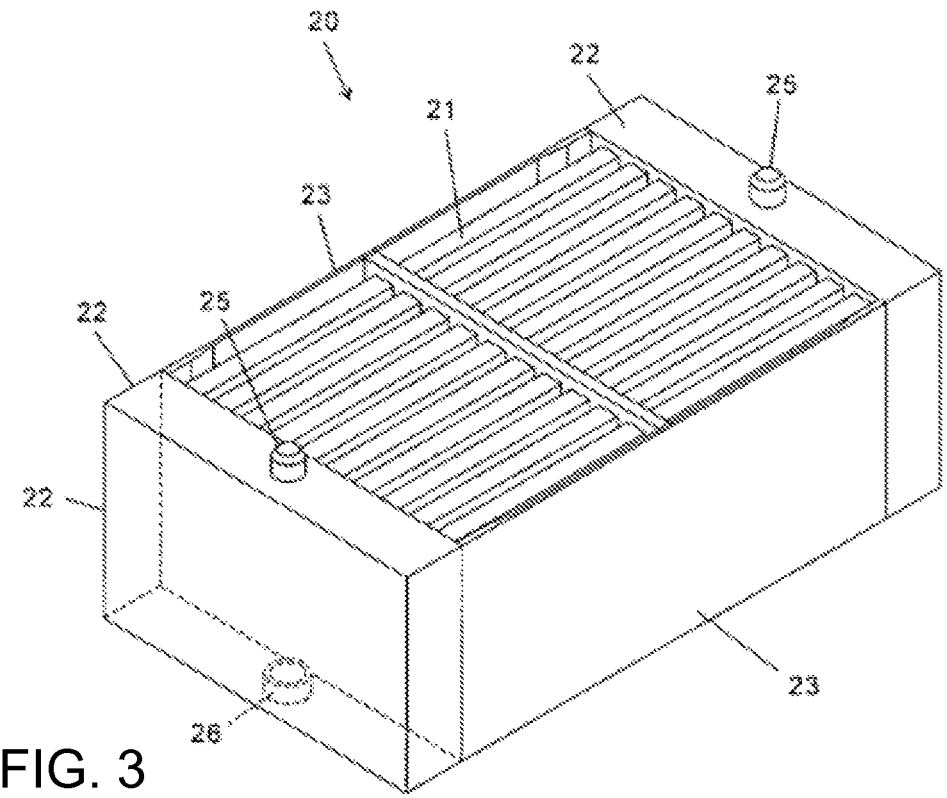
FIG. 3 is a diagram explaining a membrane element.

As shown in FIG. 3, each of the membrane module 20 includes a plurality of membrane elements 21 arranged in a space defined by a pair of water collection cases 22 and a pair of right and left cover members 23.

A filter plate 21a is formed of ABS resin and the like, and a separation membrane 21b is formed by applying and impregnating a porous resin into a non-woven fabric as a base material. The filter plate 21a is not limited to a rigid material such as ABS resin, but may be formed using a flexible material such as a sheet-shaped non-woven fabric or a net.

The water collection cases 22 and the cover members 23 are obtained by injection molding of ABS resin, polypropylene, or the like. It is preferable that the water collection cases 22 are made of a transparent or translucent material such that it may be easy to check if the sludge flows into the water collection cases 22 due to a damaged separation membrane 21b and the like.

Figure 4:
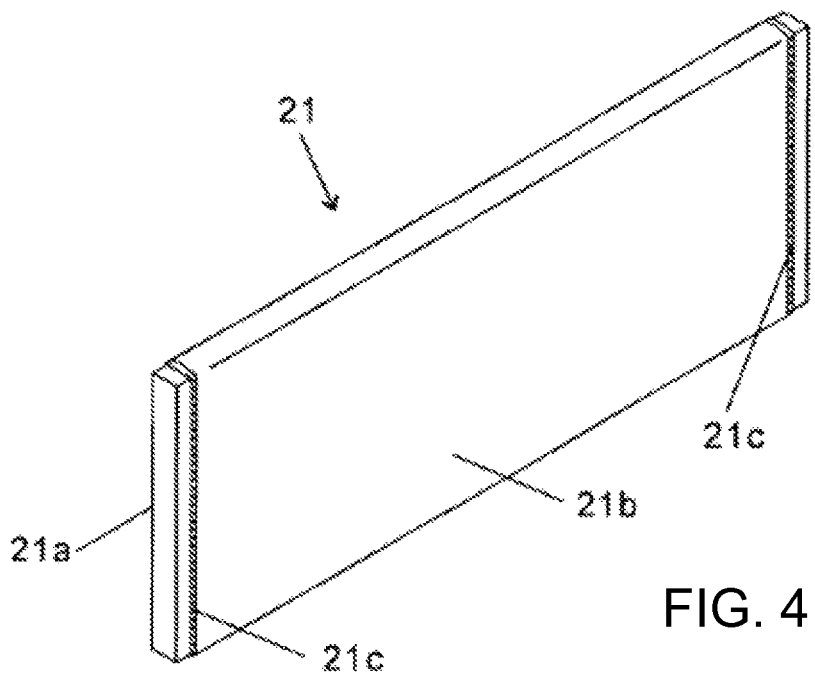

As shown in FIG. 4, each membrane element 21 includes the separation membrane 21b provided on both of the front and rear surfaces of the filter plate 21a which is a membrane support body in a form of a flat panel. The separation membrane 21b is disposed on the front and rear surfaces of the filter plate 21a by turning over at an upper side edge and a lower side edge of the filter plate 21a.

The separation membrane 21b is wrapped around the circumference of the filter plate 21a and an overlapped portion is adhered or welded so as to have no end, and also adhered, welded, or pressed onto the filter panel 21a in the side portion in the transverse direction of the membrane element 21 or in the vicinity thereof. For example, ultrasonic welding, hot welding, adhesion by adhesives, or pressing means by a pressing member can be used, and a bonding portion 21c is formed by the portion that is adhered, welded or pressed.

If the aeration by a diffuser is continued in a state where the filtration operation is stopped, the treated water filtered through the separation membrane 21b and a gas evaporated from the treated water are gradually collected between the filter plate 21a and the separation membrane 21b, and the collected treated water and gas are pushed up by the upward flow. However, since the separation membrane 21b is provided on the both sides of the filter plate 21a by turning over at least at the upper side edge of the filter plate 21a, the separation membrane 21b pushed up by the upward flow bulges also in the upper edge portion of the filter plate 21a. As a result, the degree of the bulge toward the opposing side surfaces can be made small, and the resistance against the upward flow can be reduced.

A plurality of flow passages extending in the horizontal direction are formed through the filter plate 21a and arranged in parallel in the longitudinal direction. A plurality of minute holes in communication with the flow passages are formed on both of the front and rear side surfaces of the filter plate 21a. The treated water which has been filtered through the separation membrane 21b flows through the flow passages via the minute holes, and then flows out of the both ends of the filter plate 21a.

Figure 5:
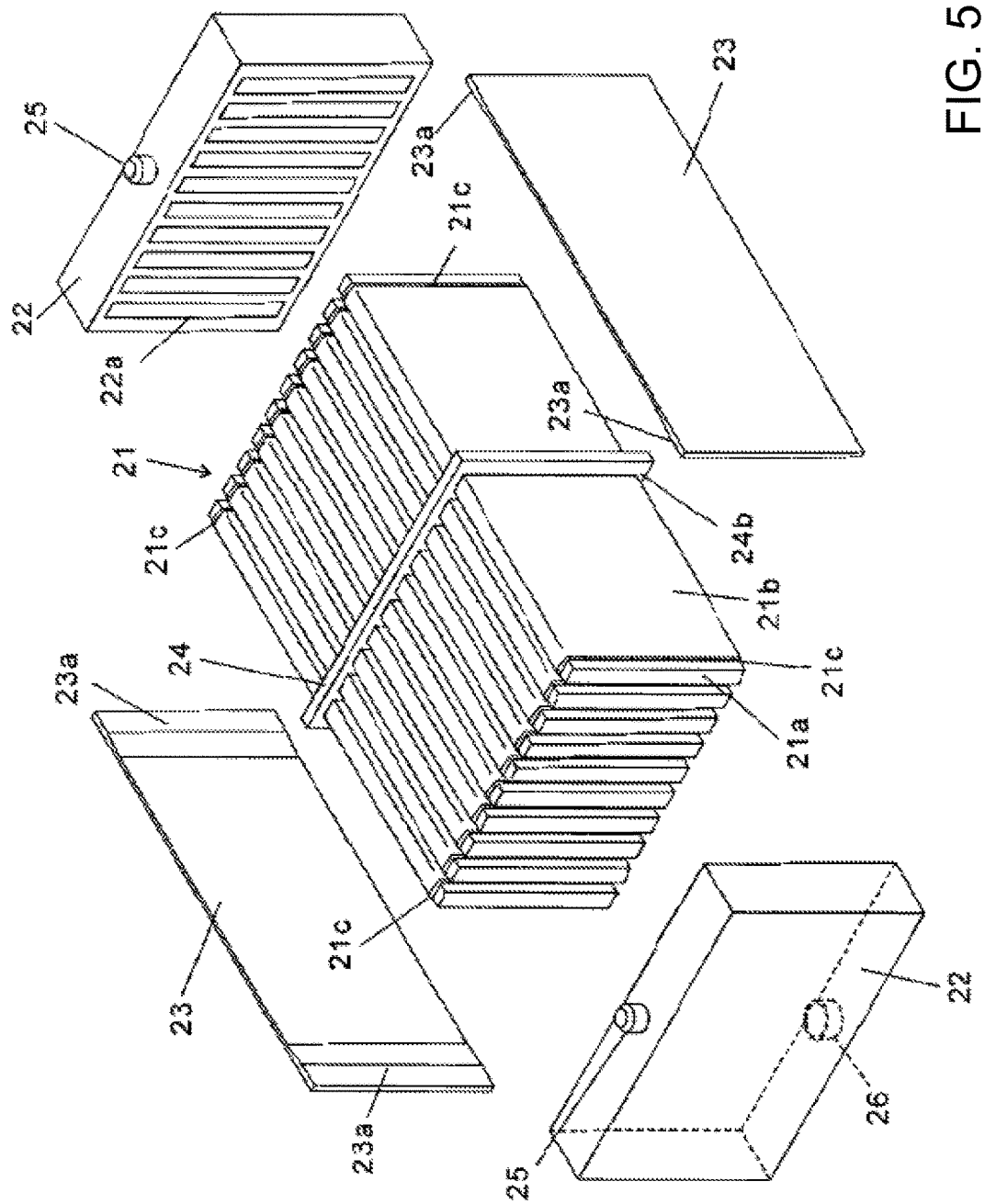
FIG. 5 is a diagram explaining each part of the membrane module.

As shown in FIG. 5, the spacer member 24 which maintains the fixed distance between the membrane elements 21 is provided in a center position of each membrane element 21 in the lateral direction.

The spacer member 24 has a plurality of slits 24b which are extending in the longitudinal direction and arranged in parallel in the horizontal direction. Each membrane element 21 is inserted into a corresponding slit 24b such that the membrane elements 21 are arranged in the longitudinal position and spaced apart from one another by the fixed distance. It is preferable that the spacer member 24 is formed of an elastic material such as a synthetic rubber, such that vibrations of the membrane elements 21 due to the upward flow can be absorbed while the spacer member 24 maintains the spacing between the membrane elements 21, and that abrasion of the separation membrane 21b by contact can also be reduced.

Figure 6:
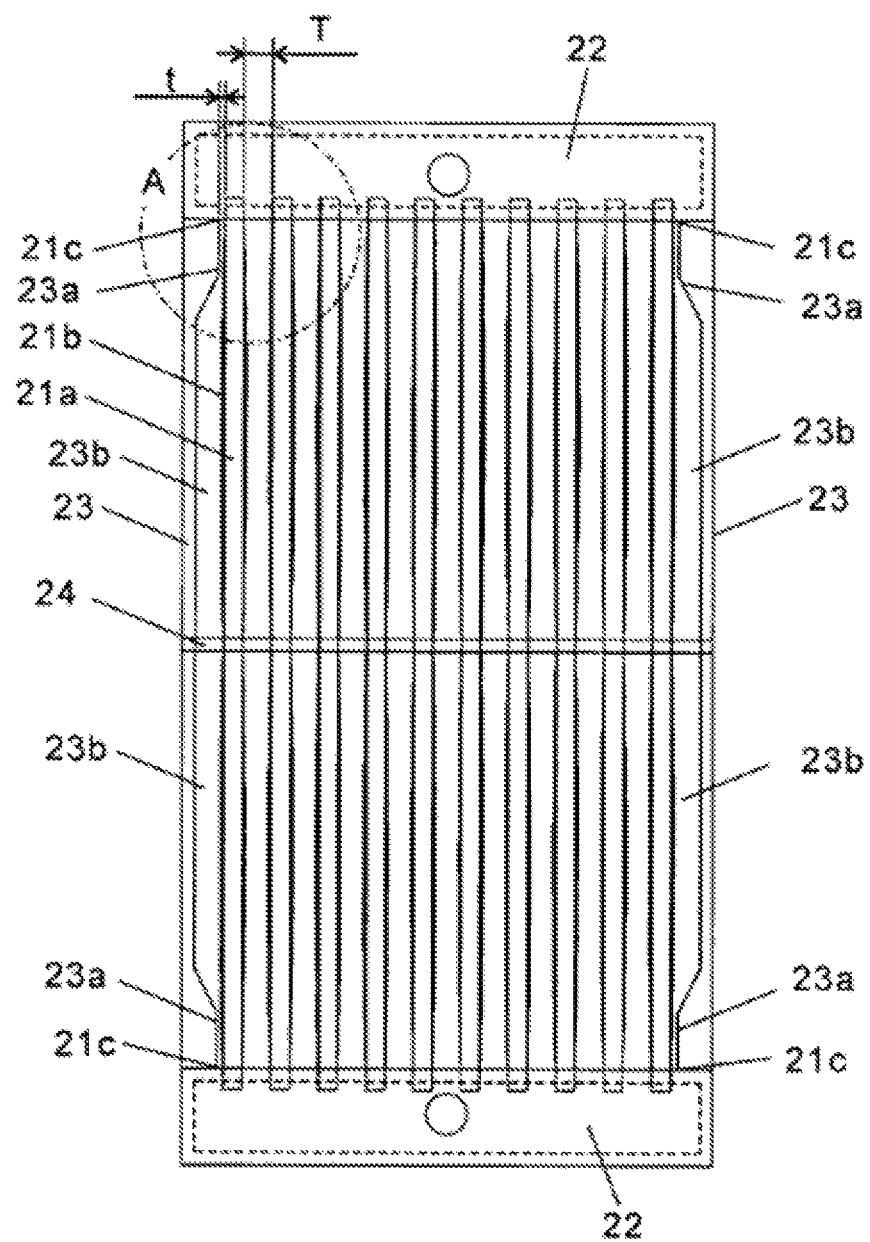
FIG. 6 is a diagram showing a schematic view of the membrane module.

As shown in FIG. 5 and FIG. 6, the plurality of membrane element 21 are arranged in the longitudinal position separated by the spacer member 24 with the fixed distance such that the separation membranes 21b of the respective membrane elements 21 face one another, and the water collection case 22 is connected to the traverse direction side portion of each of the membrane elements 21. The water collection case 22 is hollowed out so as to have a collection space therein, and includes connecting portions 25 and 26 which are formed on the upper and lower sides thereof, respectively, and are in communication with the collection space.

A plurality of slits 22a are formed on opposing side faces of the pair of the water collection cases 22, where the slits 22a have the same pitch as that of the slits 24b formed in the spacer member 24.

Figure 7A:
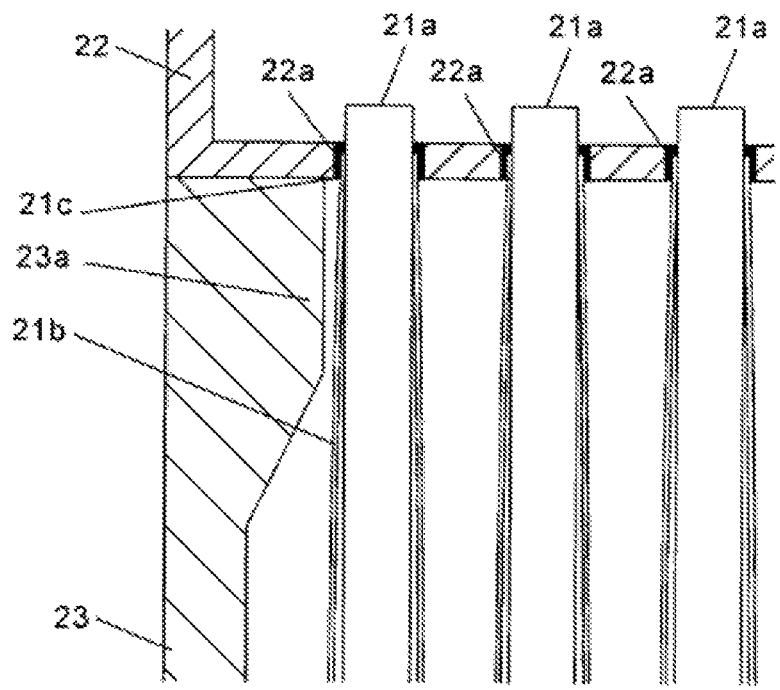
FIG. 7A is an enlarged view of Section A of FIG. 6.

As shown in FIG. 7A, each of the membrane elements 21 is connected to the water collection cases 22 by inserting the filter plate 21a along with the separation membrane 21b into the slit 22a, and then, in this inserted state, filling the slit 22a with a resin. As a result, the treated water which has been filtered through the separation membrane 21b is led into each of the water collection cases 22 through the flow passages formed in the filter plate 21a. The boundary of the slit 22a and the separation membrane 21b becomes the bonding portion 21c.

Figure 7B:
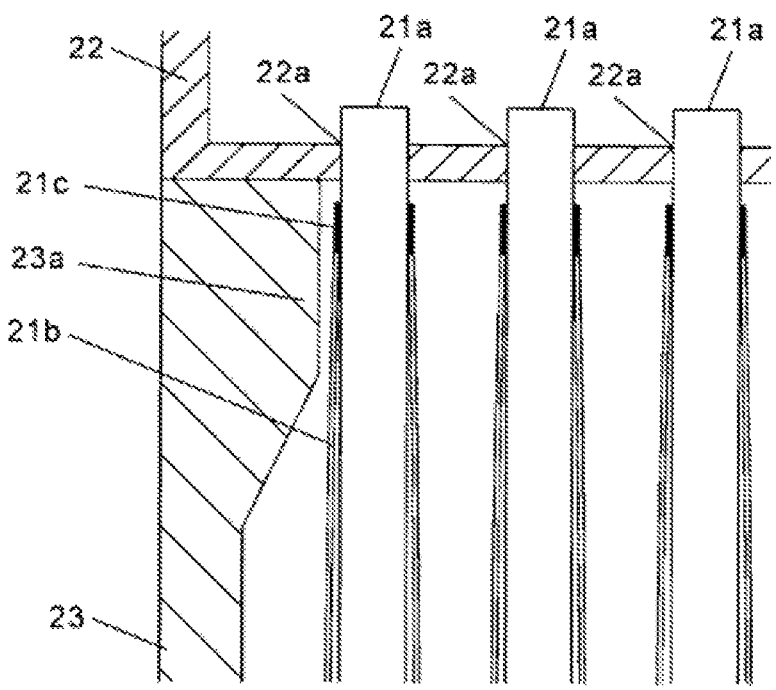
FIG. 7B is an enlarged view of Section A in another embodiment.

As shown in FIG. 7B, each of the membrane elements 21b may also be connected to the water collection cases 22 by being adhered or welded thereto in such a state that only the traverse direction side portion of the filter plate 21a is inserted in the slit 22a. In this case, the bonding portion 21c will be located on an inner side of the connecting portion of the filter plate 21a and the slit 22a. As a result, the treated water which has been filtered through the separation membrane 21b is led into each of the water collection cases 22 through the flow passages formed in the filter plate 21a.

Referring back to FIG. 5 and FIG. 6, the pair of cover members 23 are disposed on respective outer side of the outermost membrane elements 21 in the arrangement direction so as to have a certain distance from the corresponding outermost membrane elements 21 such that a flow path for the water to be treated is formed. In addition, the both ends of each of the cover members 23 are adhered or welded to the water collection cases 22 in a state where the cover member 23 is inserted in a slit 24b formed near the corresponding end portion in the transverse direction of the spacer member 24.

Each of the cover members 23 includes a narrowing member 23a integrally formed on a surface thereof which faces the outermost membrane element 21 disposed at the outermost position along the arrangement direction, in the vicinity of the bonding portion 21c of the filter plate 21a and the separation membrane 21b of the membrane element 21 along the longitudinal direction.

As shown in FIG. 6, the narrowing member 23a protrudes toward a bonding portion 21c side of the outermost membrane element 21 disposed at the outermost position along the arranged direction so as to provide the predetermined distance which is smaller than the fixed distance, that is, the distance T between the opposing faces of the adjacent membrane elements 21. The predetermined distance is set equal to or smaller than a half of the fixed distance, that is, the distance T between the opposing faces of the adjacent membrane elements 21.

By above-mentioned configuration, the degree of bulge of the separation membrane 21b formed between the narrowing member 23a and the bonding portion 21c of the membrane element 21 becomes equal to or smaller than the degree of the bulging portion of the separation membrane 21b formed between the opposing faces of the adjacent membrane elements 21, thereby avoiding a risk that the rupture of the separation membranes 21b occurs intensively in the bonding portion 21c of the outermost membrane element 21.

The narrowing member 23a includes a protrusion which is formed on a surface of the cover member 23 facing the bonding portion 21c of the outermost membrane element 21 disposed at the outermost position along the arrangement direction so as to have a thickness greater than that of the middle portion of the cover member 23, and the protrusion and the middle portion are connected to each other by a gently sloped surface. In this embodiment, the narrowing member 23a is formed from an upper end to the lower end of the membrane element 21, that is, formed across a range covering the entire bonding portion 21c. A space 23b between narrowing portions 2a forms the flow path for the upward flow of water to be treated.

Figure 8A:
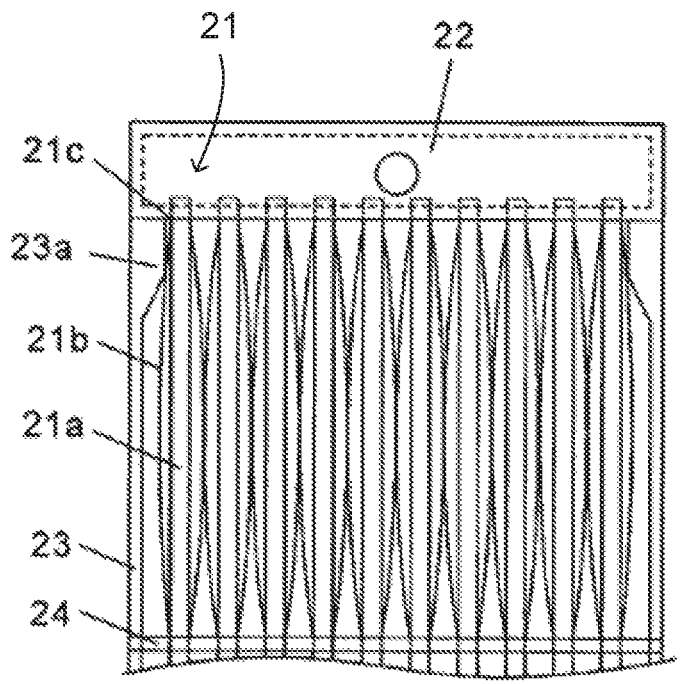
FIG. 8A is a diagram explaining that the degree of a bulge of the separation membrane is reduced by a narrowing member.

As shown in FIG. 8A, by providing the cover member 23 with the narrowing member 23a, the separation membrane 21b of the outermost membrane element 21 disposed at the outermost position along the arrangement direction abuts the narrowing member 23a when the aeration by the diffuser is continued after the filtration operation is stopped.

Figure 8B:
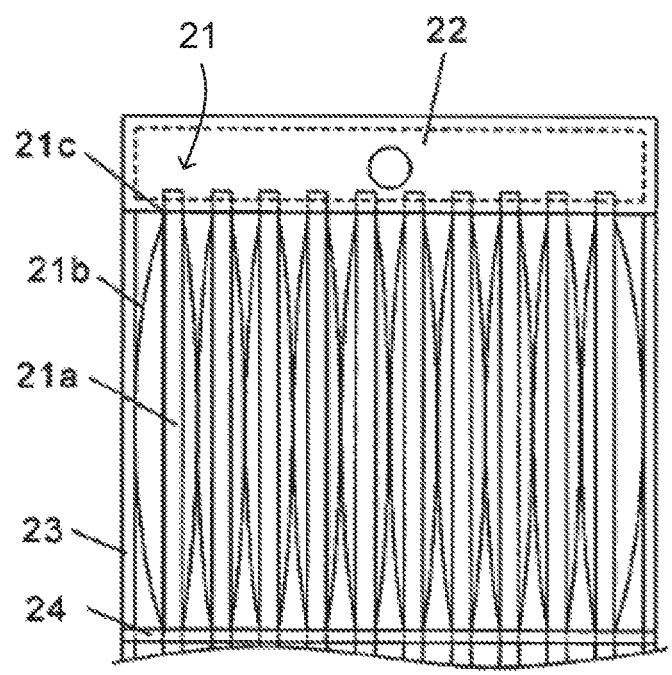
FIG. 8B is a diagram explaining the degree of a bulge of the separation membrane when no narrowing member is provided.

As shown in FIG. 8B, an angle formed between the filter plate 21a and the separation membrane 21b in the vicinity of the bonding portion 21c of the outer side membrane element 21 does not become too large compared with an angle of the filter plate 21a and the separation membrane 21b in the vicinity of the bonding portion 21c of the membrane element 21 without the narrowing member. That is, it is possible to prevent a large force from being applied to the separation membrane 21b in the vicinity of the bonding portion 21c so as to reduce the risk the rupture of the separation membrane 21b.

Referring back to FIG. 2, the upper connecting portion 25 of the far left membrane module 20 of the top stage, and the lower connection portion 26 of the far right membrane module 20 of the bottom stage, are connected to the respective collection pipe 13, while the lower connecting portion 26 of the far left membrane module 20 of the top stage, and the upper connecting portion 25 of the far right membrane module 20 of the bottom stage, are sealed by a sealing member (not shown). It should be noted that in FIG. 2, the description of the upper connecting portion 25 and the lower connecting portion 26 is omitted, and the direction of flow of the treated water is shown by dashed arrows.

A membrane separation device in accordance with another embodiment of the present invention is described below. Although in the above-described embodiment, the narrowing member 23a is formed from the upper end to the lower end of the membrane element 21, that is, formed across the range covering the entire bonding portion 21c, the narrowing member 23a may be formed at least an upper part of the vicinity of the bonding portion 21c.

If the aeration by the diffuser is continued in a state where the filtration operation is stopped, the treated water and gas collected between the filter plate 21a and the separation membrane 21b will be pushed up by the upward flow, so as to form the bulging portion in the upper part of the membrane element 21. However, the bulging portion is prevented from becoming too large by providing the narrowing member 23a at least in the upper part in the vicinity of the bonding portion 21c, and thus the risk of the rupture the separation membrane 21b in the upper part of the vicinity of the bonding portion 21c can be reduced.

In addition, the narrowing member is not limited to be integrally formed with the cover member, but it can be formed as a member separate from the cover member, and furthermore, the narrowing member can be attached to the cover member by adhesion, welding, or the like.

In the above-mentioned embodiment, the narrowing member 23a is provided as a protrusion formed on the surface of the cover member 23 facing the bonding portion 21c of the outermost membrane element 21 disposed at the outermost position along the arrangement direction so as to have the thickness greater than that of the middle portion of the cover member 23, and the protrusion and the middle portion are connected to each other by the gently sloped surface. However, the middle portion and the protrusion may be connected to each other by a smoothly curved surface, not by the sloped surface.

Figure 9A:
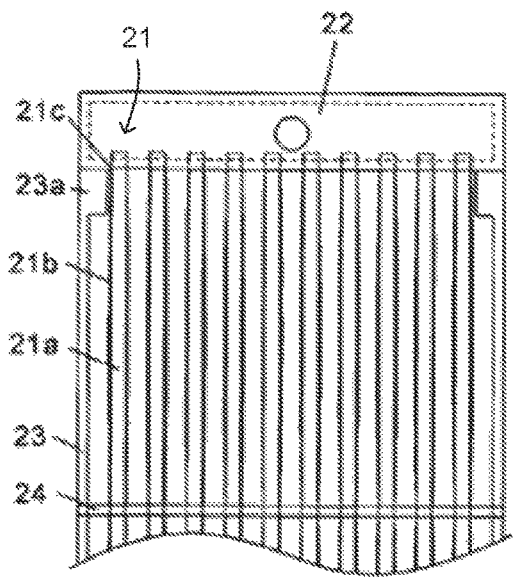
FIG. 9A is a diagram explaining a narrowing member in accordance with another embodiment.

Furthermore, as shown in FIG. 9A, the narrowing member 23a and the cover member 23 can also be formed without connecting by a sloped surface or a curved surface.

Figure 9B:
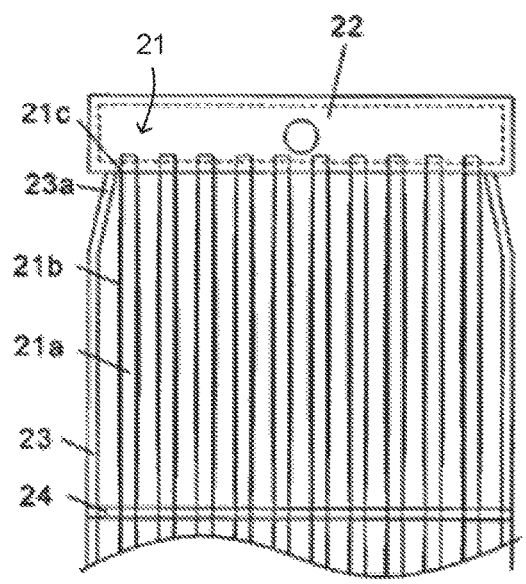
FIG. 9B is a diagram explaining a narrowing member in accordance with yet another embodiment.

As shown in FIG. 9B, an end portion of the cover member 23 which faces the bonding portion 21c of the outermost membrane element 21 disposed at the outermost position along the arrangement direction may be bent toward the membrane element 21 side so as to function as the narrowing member 23a.

Figure 9C:
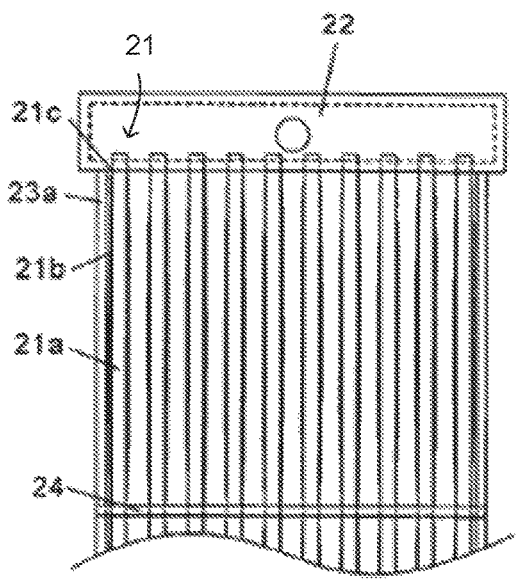
FIG. 9C is a diagram explaining a narrowing member in accordance with yet another embodiment.

As shown in FIG. 9C, the cover member 23 may be arranged such that a distance from the bonding portion 21c of the outermost membrane element 21 disposed at the outermost position along the arrangement direction is made smaller than the distance between the opposing surfaces of the adjacent membrane elements 21, such that the cover member 23 itself functions as a narrowing member.

Figure 9D:
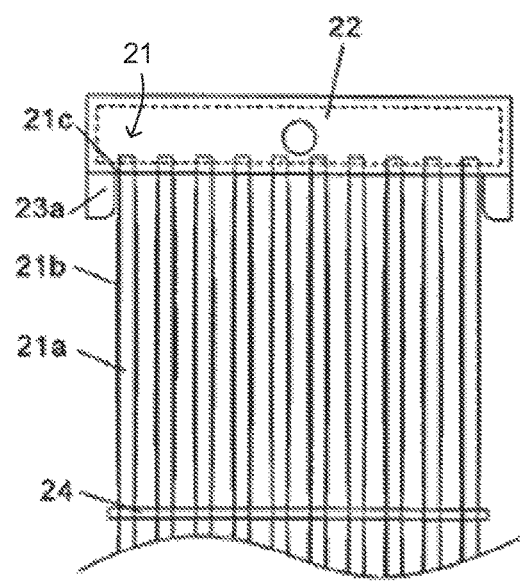
FIG. 9D is a diagram explaining a narrowing member in accordance with yet another embodiment.
Figure 10A:
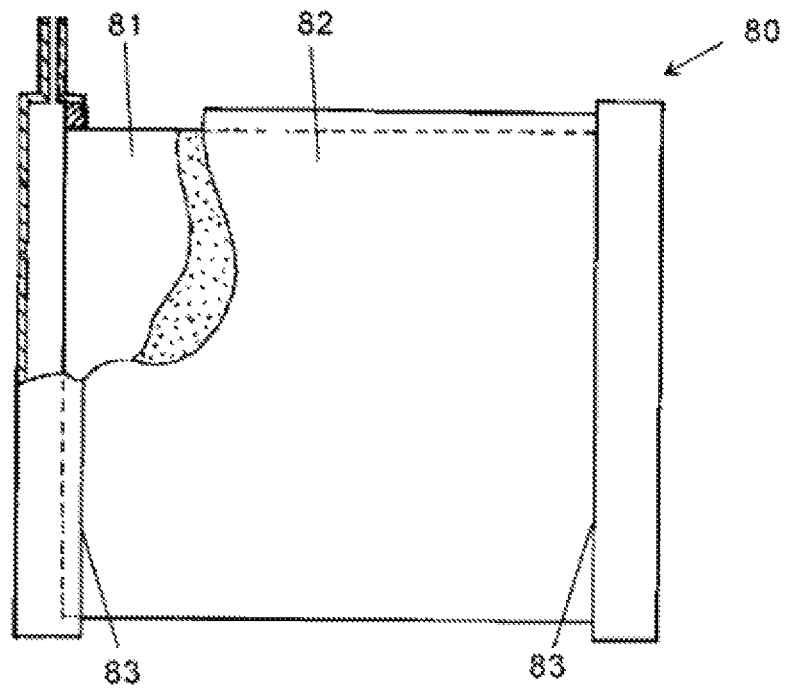
FIG. 10A is a diagram showing a schematic view of a membrane element of a conventional membrane separation device.
Figure 10B:
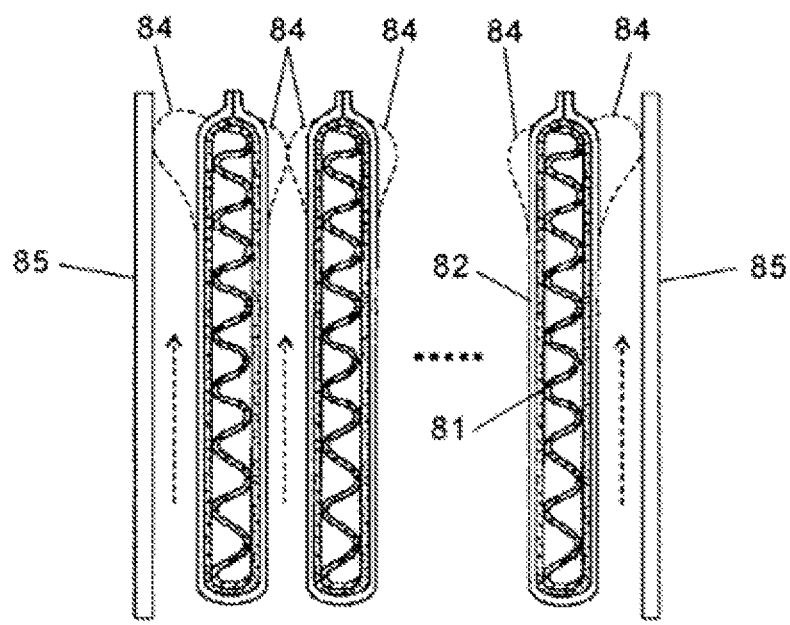
FIG. 10B is a diagram explaining a bulging portion formed in a membrane element of the conventional membrane separation device.

As shown in FIG. 9D, the narrowing member 23a may be integrally formed with, adhered to, or welded to the water collection case 22, instead of being provided onto the membrane module.

In addition, although the narrowing member 23a described in the above-mentioned embodiment is only provided to a location which faces the transverse direction side portion of the outermost membrane element 21 disposed at the outermost position along the arrangement direction, the narrowing member can also be provided to any location that faces a bonding portion, if such a bonding portion of the separation membrane and the filter plate is formed in a location other than the transverse direction side portion of the membrane elements, for example, in the vicinity of the spacer member which is disposed in the central portion of the membrane elements in the transverse direction so as to maintain the predetermined interval of the membrane elements.

Furthermore, although the membrane module having the water collection cases provided on both sides of the membrane element is described in the above-mentioned embodiment, the membrane module is not limited to this, and the membrane module may be any membrane module that has a bonding portion bonding the membrane support body and the separation membrane along the longitudinal direction, for example, a membrane module that is configured to detachably accommodate membrane elements inside a casing member.

Each embodiment mentioned above is an example of the present invention, and the present invention is not limited by the description. A design of the specific structure of each part can be changed so long as the function and effect of the present invention can be achieved.

What is claimed is:

1. A membrane separation device comprising:
    a plurality of membrane elements arranged in a standing position with a predetermined gap provided therebetween such that the plurality of membrane elements are separated from one another by a fixed distance so as to form an open flow passage, each of the plurality of membrane elements including:
        a membrane support body in a form of a flat panel or sheet having a front surface and a rear surface; and
        a separation membrane wrapped around the membrane support body so as to substantially cover the front surface and the rear surface by turning over at an upper side edge of the membrane support body, and expose at least one side end portion of the membrane support body, the separation membrane being attached to the membrane support body by a longitudinal bonding portion provided along the at least one side end portion;
    a water collection case to which the plurality of membrane elements are connected by inserting thereto the at least one side end portion of each membrane support body, the water collection case having a water collection space therein into which treated water filtered by the plurality of membrane elements is collected;
    a cover member provided adjacent to at least one outermost membrane element of the plurality of membrane elements; and
    a narrowing member provided on the cover member so as to face the longitudinal bonding portion of the at least one outermost membrane element such that the narrowing member is separated from the at least one outermost membrane element by a predetermined distance smaller than the fixed distance, a remaining portion of the cover member without the narrowing member being separated from the at least one outermost membrane element by the fixed distance.

2. The membrane separation device according to claim 1, wherein the narrowing member is provided at least near an upper portion of the longitudinal bonding portion.

3. The membrane separation device according to claim 1, wherein the separation membrane is turned over at least at an upper side edge of the membrane support body so as to be disposed on both of the front and rear surfaces of the membrane support body.

4. The membrane separation device according to claim 1, wherein the predetermined distance is set equal to or smaller than a half of the fixed distance.

5. The membrane separation device according to claim 2, wherein the separation membrane is turned over at least at an upper side edge of the membrane support body so as to be disposed on both of front and rear sides of the membrane support body.

6. The membrane separation device according to claim 2, wherein the predetermined distance is set equal to or smaller than a half of the fixed distance.

7. The membrane separation device according to claim 3, wherein the predetermined distance is set equal to or smaller than a half of the fixed distance.

8. The membrane separation device according to claim 1, wherein the narrowing member is configured to restrict bulging of the separation membrane from a surface of the membrane support body adjacent to the longitudinal bonding portion in the at least one outermost membrane element.

9. The membrane separation device according to claim 1, wherein the membrane support body includes a plurality of flow passages provided therethrough, each of the plurality of flow passages extending in a horizontal direction and having an opening on both ends of the membrane support body.

10. The membrane separation device according to claim 9, wherein the front and rear surfaces of the membrane support body have a plurality of minute holes in communication with the flow passages.

11. The membrane separation device according to claim 1, wherein the longitudinal bonding portion is formed in a connecting portion of the membrane support body and the water collection case.

12. The membrane separation device according to claim 1, wherein the longitudinal bonding portion is formed outside the water collection case.

13. The membrane separation device according to claim 1, wherein the cover member is not provided with a separation membrane.

* * * * *